United States Patent [19]

Brophy, Sr. et al.

[11] Patent Number: 4,525,929
[45] Date of Patent: Jul. 2, 1985

[54] CUTTING DEVICE

[76] Inventors: H. Joseph Brophy, Sr.; H. Joseph Brophy, Jr., both of 9 Garrison Ave., Somerville, Mass. 02144

[21] Appl. No.: 423,712

[22] Filed: Sep. 27, 1982

[51] Int. Cl.³ .................. B26B 17/02; B26B 13/26
[52] U.S. Cl. .................................. 30/181; 30/192; 30/238; 30/251
[58] Field of Search .............. 30/181, 204, 237, 186, 30/193, 238, 192, 231, 251; 81/347, 348, 349, 350, 351, 352, 353, 354

[56] References Cited

U.S. PATENT DOCUMENTS

| 2,207,994 | 7/1940 | Trapp | 30/181 |
| 2,262,645 | 11/1941 | Newman | 30/181 |
| 2,495,677 | 1/1950 | Boyer | 30/181 |
| 2,508,790 | 5/1950 | Herr | 30/181 |
| 2,528,816 | 11/1950 | Boyer | 30/251 X |
| 2,564,154 | 8/1951 | Compton | 30/238 |

FOREIGN PATENT DOCUMENTS

1381 of 1913 United Kingdom ................ 30/181

Primary Examiner—Jimmy C. Peters
Attorney, Agent, or Firm—Joseph S. Iandiorio; William E. Noonan

[57] ABSTRACT

An improved cutting device including: first and second handles and a movable jaw having forward and rearward portions; a stationary jaw fixed to the first handle, the second handle including first pivot means for connecting the second handle to the stationary jaw and second pivot means for connecting the second handle to the movable jaw for providing slicing action between the jaws; and means, spaced from the first and second pivot means, for constraining motion of the rearward portion of the movable jaw and amplifying the leverage applied to the jaws by the handles through the first and second pivot means.

27 Claims, 9 Drawing Figures

CUTTING DEVICE

FIELD OF INVENTION

This invention relates to an improved cutting device and in particular to cutters having an amplified slicing force.

BACKGROUND OF INVENTION

Presently available pruning shears and similar lopping or cutting devices very often exhibit one or more of a number of features which hinder their intended use. Typically these devices include a pair of pivotably attached blades which may be closed for cutting in a purely scissorlike or shearing fashion. The blades of such cutters tend to bind or jam when encountering thick or tough limbs, twigs or other brush material. As a result, cutting is frustrated, the cutters may be damaged and the operator may suffer undue strain.

Cutting devices have been known which employ both a shearing and a slicing action. In one such construction, one of the blades is fixed to a first handle and the other blade is slidably attached to that handle. A second handle is attached to the fixed blade only. A relatively intricate mechanism is required to urge the movable blade longitudinally forward while it is being closed. The effectiveness of such cutters, especially when encountering tough material, is less than optimal. A simplified construction which provides amplified leverage action is needed to enhance cutting performance.

Additionally, presently known cutting devices often become ineffective over extended use due to blade wear. As the cutting edges of the blades are worn down, a gap may be created between the blades which remains even when the blades are closed. It may thus become impossible to cut cleanly through the desired material. Replacement of one or both of the blades may be required.

SUMMARY OF INVENTION

It is therefore an object of this invention to provide an improved cutting device which exhibits an enhanced scissoring and slicing cutting action and enables improved cutting through tree limbs, hedges, undergrowth and similar material.

It is a further object of this invention to provide a cutting device which exhibits improved cutting leverage, thereby enabling clean, complete, efficient and quick performance of cutting tasks.

It is a further object of this invention to provide a cutting device which reduces binding and jamming of material to be cut, thereby facilitating cutting through thick and tough material.

It is a further object of this invention to provide a cutting device which compensates for blade wear to provide a complete, effective cutting action over continued use.

This invention features an improved cutting device including first and second handles and a movable jaw having forward and rearward portions. A stationary jaw is fixed to the first handle. The second handle includes first pivot means for connecting the second handle to the stationary jaw and second pivot means for connecting the second handle to the movable jaw, for providing slicing action between the jaws. There are means spaced from the first and second pivot means for constraining motion of the rearward portion of the movable jaw and amplifying the leverage applied to the jaws by the handles through the first and second pivot means.

In a preferred embodiment of this invention the means for constraining may include link means spaced from and generally parallel to the portion of the second handle extending between the first and second pivot means. Such link means have third and fourth pivot means interconnecting the link means with the stationary and movable jaws, respectively. The stationary and movable jaws may be arranged parallel to each other.

Alternatively, the means for constraining may include guide means for maintaining location of the rearward portion of the movable jaw relative to the stationary jaw so that the forward portion of the movable jaw approaches the stationary jaw in a rocking motion. The guide means may include a cam surface on one of the jaws and a cam follower on the other. The guide means may also include connector means slidably interconnecting the stationary and movable jaws. Such connector means may include a follower pin on one of the jaws and a slot for receiving the follower pin on the other jaw. The follower pin may include a roller.

Adjustment means may be included for controlling distance between the rearward portion of the movable jaw and the stationary jaw so that the forward portion of the movable jaw is set to engage the stationary jaw. One of the jaws may include a cutting edge. The other jaw may include an engagement surface for abuttably engaging the cutting edge when the handles are pivoted together.

In preferred embodiments of this invention, the jaws are enabled to engage in a slicing action in which the movable jaw moves in a rearward direction when the handles are pivoted together and in a forward direction when the handles are pivoted apart.

DISCLOSURE OF PREFERRED EMBODIMENTS

Other objects, features and advantages will occur from the following description of preferred embodiments and the accompanying drawings, in which.

An improved cutting device according to this invention may be effected using first and second handles and a movable jaw having forward and rearward portions.

The handles may be constructed from steel or other suitable metal alloy, wood, plastic, or other sturdy material. A stationary jaw is fixed in any suitable manner to the first handle. For example, the stationary jaw may be connected by bolts or similar connecting means to the first handle or, alternatively, may be integral with the first handle and comprise an extension thereof.

The second handle includes first pivot means for connecting the second handle to the stationary jaw and second pivot means for connecting the second handle to the movable jaw for providing slicing action between the jaws. Preferably, in performing such slicing action the movable jaw moves in a rearward direction when the handles are pivoted together and in a forward direction when the handles are pivoted apart.

There are means spaced from the first and second pivot means for contraining motion of the rearward portion of the movable jaw to amplify the leverage applied to the jaws by the handles through the first and second pivot means. Such means for constraining may include for example, link means spaced from and generally parallel to the portion of the second handle extending between the first and second pivot means. Third and fourth pivot means interconnect the link means with the stationary and movable jaws, respectively. The stationary and movable jaws are typically arranged parallel to each other, thereby enabling the jaws and the link and the portion of the first handle between the first and second pivot means to maintain a parallelogram configuration during opening and closing of the handles.

Alternatively, the means for constraining may include guide means for maintaining the location of the rearward portion of the movable jaw relative to the stationary jaw, so that the forward portion of the movable jaw approaches the stationary jaw in a rocking motion when the handles are pivoted together. Such guide means may include a cam surface on one of the jaws and a cam follower on the other. Typically the stationary jaw inlcudes the cam surface and the movable jaw includes the follower, although the reverse may be true. The guide means may also include connector means slidably interconnecting the stationary and movable jaws. It is preferred that the connector means include a follower pin mounted on one of the jaws and a slot for receiving the follower pin on the other jaw. The follower pin may include a roller for facilitating the sliding back and forth thereof in the slot.

Adjustment means may be provided for controlling distance between the forward portion of the movable jaw and the stationary jaw so that the forward portion of the movable jaw is set to engage the stationary jaw. It is preferred that one of the jaws include a cutting edge of steel or other hardened metal alloy. The other jaw typically includes an engagement surface for abuttably engaging the cutting edge when the handles are pivoted together. The jaw which includes the engagement surface may comprise a pair of marginal outer elements composed of a relatively hard material such as steel and a central element interposed between the outer elements. The central element, which provides the engagement surface for the cutting edge, is typically composed of a relatively soft material such as aluminum, thereby reducing wear on the cutting edge when the jaws are closed. Preferably the movable jaw includes the cutting edge and the stationary jaw includes the engagement surface. Alternatively, however, the cutting edge may be maintained by the stationary jaw and the engagement surface by the movable jaw. Further, both jaws may include cutting edges to enable a shearing cutting action.

A cutting device of the above-described construction is particularly suitable for use in gardening, groundskeeping and other outdoor maintenance applications. The amplified leverage and rearward slicing action provided by the device enables quick and clean cutting through tree limbs, hedges and brush material.

Figure 1:
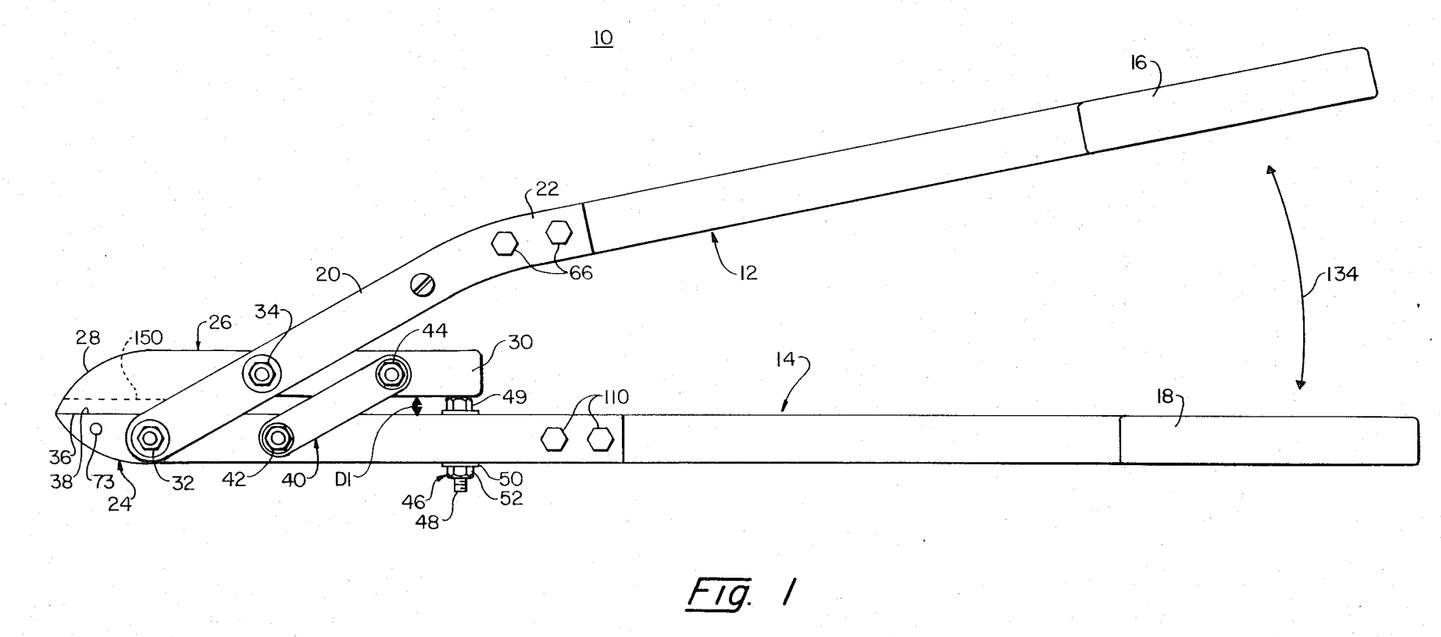
FIG. 1 is a side elevational view of an improved cutting device according to this invention in the closed condition.

There is shown in FIG. 1 an improved cutting device 10 according to this invention in a closed condition. A pair of handles 12, 14 include hand grips 16, 18, respectively, which may be constructed of rubber, wood, plastic, metal or other suitable material. Handle 12 includes a first section 20 and a second section 22, which extends at an angle from section 20 and includes the grip end 16 of handle 12. A stationary jaw 24 is connected to the distal end of handle 14. A movable jaw 26 having a forward portion 28 and a rearward portion 30 is arranged parallel to stationary jaw 24.

First portion 20 of handle 12 includes first pivot means 32, interconnecting handle 12 to stationary jaw 24, and second pivot means 34 interconnecting handle 12 to movable jaw 26. Movable jaw 26 includes a cutting edge 36 which abuttably engages an engagement surface 38 of stationary jaw 24. Link means 40 is spaced from and generally parallel to handle portion 20. Third pivot means 42 interconnects link means 40 with stationary jaw 24, and fourth pivot means 44 pivotably interconnects link means 40 with movable jaw 26.

Adjustment means 46 includes a hex bolt 48 which extends through jaw 24, in a manner explained more clearly hereinafter. Head 49 of hex bolt 48 sits on top of jaw 24, and washer 50 and nut 52 are attached to bolt 48 below jaw 24 in order to hold bolt 48 in place and prevent its unintended removal from jaw 24. Head 49 is interposed between jaws 24 and 26 so that jaw 24 can approach no closer than distance D1 to jaw 26.

Figure 2:
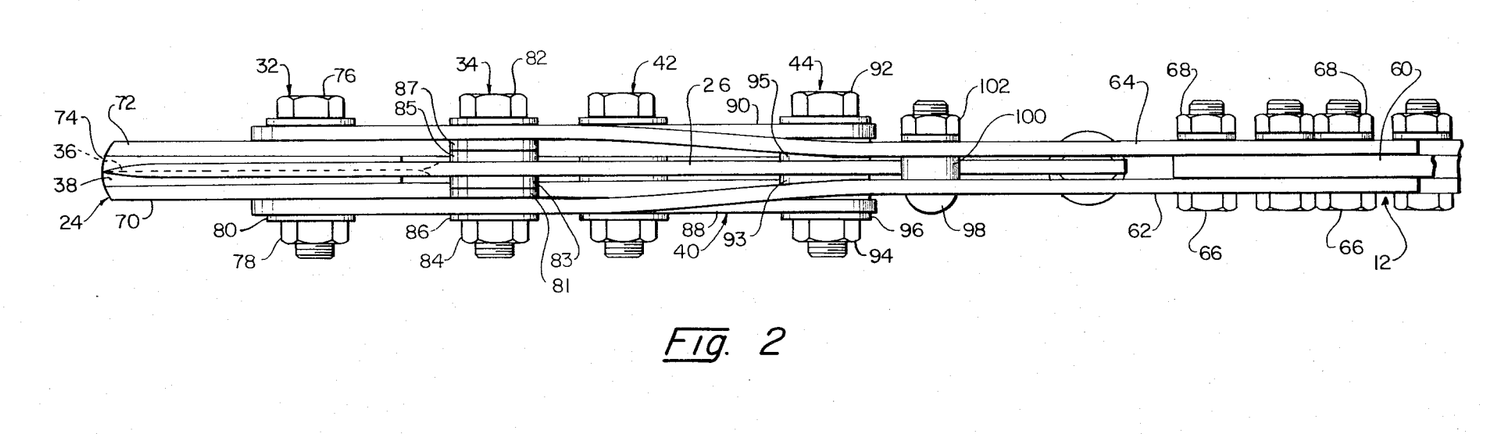
FIG. 2 is a top view of a portion of the cutting device of FIG. 1, showing in particular the jaws thereof.

As shown in FIG. 2, handle 12 includes a handle member 60 and a pair of elongate elements 62, 64 which are sandwiched about member 60 and connected thereto by means of bolts 66 extending through element 62, member 60 and element 64, and nuts 68 threadably attached to the bolts. Stationary jaw 24 includes outer elements 70, 72, which are composed of a relatively hard material such as steel, and a central element 74 which is composed of relatively soft material such as aluminum. Element 74 may be fixed or secured between elements 70, 72 by any acceptable means such as an unpictured rivet (shown as rivet 73, FIG. 1) extending therethrough. The distal ends of elongate elements 62, 64 are sandwiched about stationary jaw 24 and are connected thereto by means of first pivot 32. Pivot 32 includes a bolt 76 extending through elements 62, 64 of handle 12 and through elements 70, 72 of stationary jaw 24, and a nut 78 and washer 80 secured to bolt 76 and thereby holding it in place.

Movable jaw 26 confronts stationary jaw 24, and in particular cutting edge 36 abuttably engages engagement surface 38 provided by central element 74. Because element 74 is composed of a relatively soft material, the wear on cutting edge 36 is reduced. Movable jaw 26 is attached to elements 62, 64 of handle 12 by second pivot means 34, which includes a bolt 82 extending through element 64, movable jaw 26 and element 62, and a nut 84 and washer 86 threadably secured to bolt 82. Washers 81 and 83 are mounted on bolt 82 between member 62 and movable blade 26, and washers 85 and 87 are mounted on bolt 82 between movable blade 26 and member 64, thereby restricting lateral movement of jaw 26.

Link means 40 includes link elements 88, 90, which are pivotably interconnected to stationary jaw 24 by means of third pivot 42 and to movable blade 26 by means of fourth pivot 44. Pivot 44 includes a bolt 92 which extends through link element 90, movable jaw 26 and link element 88, and is attached thereto by means of a nut 94 and washer 96. To restrict lateral wobbling by jaw 26, washer 93 is mounted on bolt 92 between link element 88 and movable jaw 26, and washer 95 is mounted on bolt 92 between movable jaw 26 and link element 90.

A bolt 98 extends through elongate elements 62, 64 above jaw 26. A washer 100 is mounted on bolt 98 between elements 62 and 64, and a nut 102 secures bolt 98 in place, thereby preventing spreading of elements 62 and 64.

Figure 3:
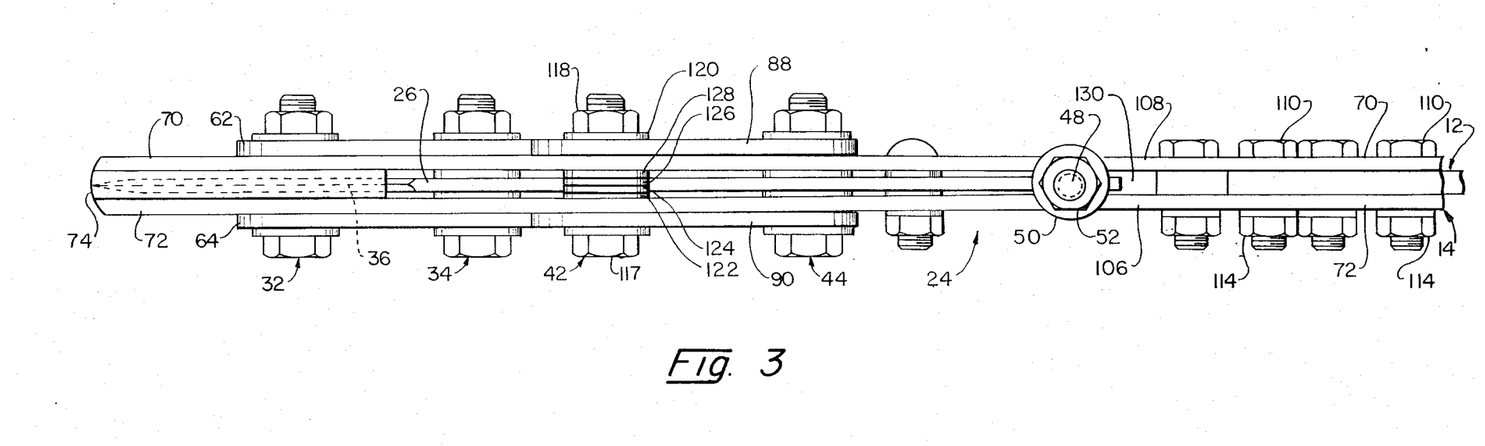
FIG. 3 is a bottom view of a portion of the cutting device of FIG. 1 showing in particular the jaws thereof.

Handle 14, FIG. 3, is interposed between elongate elements 70 and 72 and secured thereto by means of bolts 110 and nuts 114 threadably attached thereto. Elongate elements 70 and 72 define stationary jaw 24, which further includes central element 74. Pivot means 32 connects elements 62 and 64 of handle 12 to stationary jaw 24 and pivot means 34 connects elements 62 and 64 of handle 12 to movable jaw 26.

Pivot means 42 includes a bolt 117 which extends through link element 90, elongate member 72, member 70 and link element 88, and is secured thereto by nut 118 and washer 120. Spacing washers 122, 124, 126 and 128 are mounted on bolt 117 between elements 72 and 70. Pivot means 44, as previously described, interconnects link elements 88 and 90 with movable jaw 26. Hex bolt 48 extends through slot 130 between elements 70 and 72 and is secured to those elements by means of nut 52 and washer 50. The cutting edge 36 of movable jaw 26 is again shown confronting engagement surface 38, FIG. 2, of central element 74 of stationary jaw 24.

Figure 4:
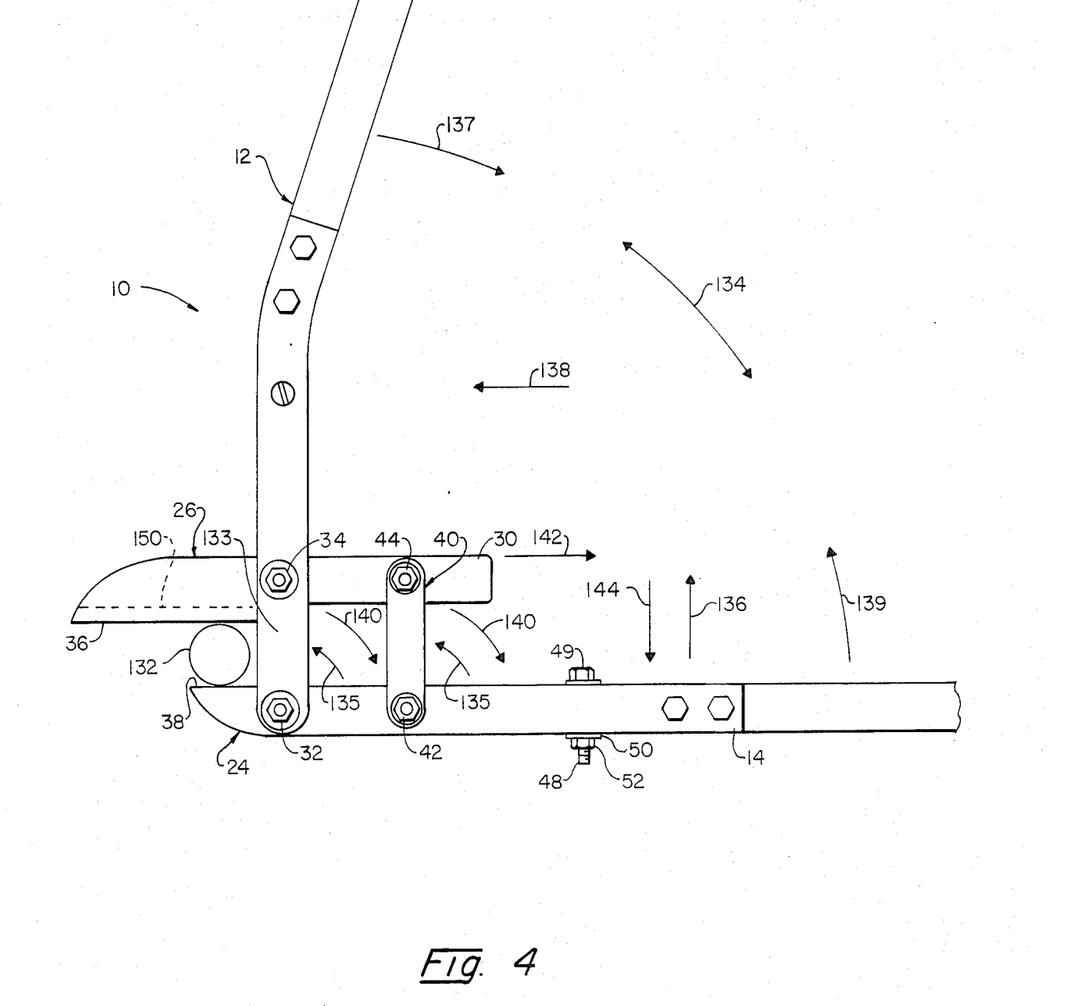
FIG. 4 is an elevational side view of the cutting device of FIGS. 1-3 in the open condition.

Cutters 10 may be utilized, as shown in FIG. 4, to cut a limb 132. Commencing in the closed condition of FIG. 1, handles 12 and 14 are pivoted apart in the direction of doubleheaded arrow 134. As shown in FIG. 4, the portion 133 of section 20 of handle 12 between pivot means 32 and 34 pivots about pivot means 32 and 34, and link means 40 pivots about pivot means 42 and 44 in the direction of arrows 135. Such pivoting enables movable jaw 26 to move, upwardly in the direction of arrow 136 and longitudinally forward in the direction of arrow 138, into an open condition. Jaws 24 and 26 are positioned about limb 132.

Handles 12 and 14 are then pivoted together, as indicated by arrows 137 and 139: the portion 133 of handle section 20 between pivots 32 and 34 and link means 40 pivot in the direction of arrows 140. Movable jaw 26 moves both in a longitudinally rearward direction, as exhibited by arrow 142, and in a closing direction as indicated by arrow 144. Cutting edge 36 of jaw 26 and engagement surface 38 of jaw 24 bear on limb 132 to perform both a slicing and a scissoring cutting action. Link means 40 constrains the rearward portion 30 of movable jaw 26 such that the leverage applied to the closing jaws 24 and 26 (and thus to limb 132) through pivots 32 and 34 is amplified. The enhanced leverage provided by link means 40 enables quick and efficient cutting through limb 132. Cutters 10 finally attain the closed position shown in FIG. 1, wherein cutting is completed and cutting edge 36 of jaw 26 abuts engagement surface 38 of jaw 24. Note that during both opening and closing of jaws 24 and 26 link means 40 remains parallel to handle portion 133 and the portion of jaw 24 between pivots 32 and 42 remains parallel to the portion of jaw 26 between pivots 34 and 44, i.e., the above elements maintain a parallelogram configuration throughout operation of cutters 10.

Figure 5:
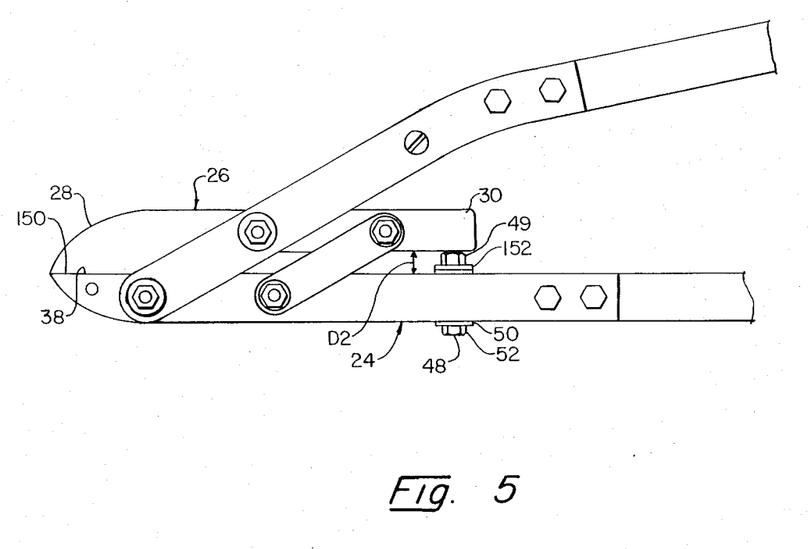
FIG. 5 is an elevational side view of a portion of the cutting device illustrating operation of the adjustment means.

Adjustment means 46 may be utilized in the following manner. Over continued use, cutting edge 36 may tend to wear down to a point indicated by dashed line 150, FIGS. 1 and 4. In such instances a gap is created between the cutting edge and engagement surface 38 in the closed condition of FIG. 1. However, for optimal cutting performance it is necessary for the cutting edge and engagement surface to abuttably engage. Accordingly, when cutters 10 are in the open condition of FIG. 4, the worn jaw 26 may be adjusted. Nut 52 and washer 50 are loosened and hex bolt 48 is removed from stationary jaw 26. As shown in FIG. 5, bolt 48 is then replaced with one or more washers 152 interposed between head 49 of bolt 48 and stationary jaw 24. Nut 52 and washer 50 are reattached to bolt 48. Movable jaw 26 is closed as previously described. Rearward portion 30 bears upon head 49 of the raised hex bolt 48. Rearward end 30 of jaw 26 can approach no closer to jaw 24 than a distance D2, which is greater than D1 (FIG. 1) due to the raised condition of bolt 48. Forward end 28 is thus pivoted downwardly so that worn cutting edge 150 is reset to abuttably engage with engagement surface 38. By raising and lowering hex bolt 48 in this manner, e.g. by adding and removing washers 152, the distance between the rearward end 30 of jaw 26 and stationary jaw 24 may be controlled so that the forward end 28 of jaw 26 is set to engage jaw 24.

Figure 6:
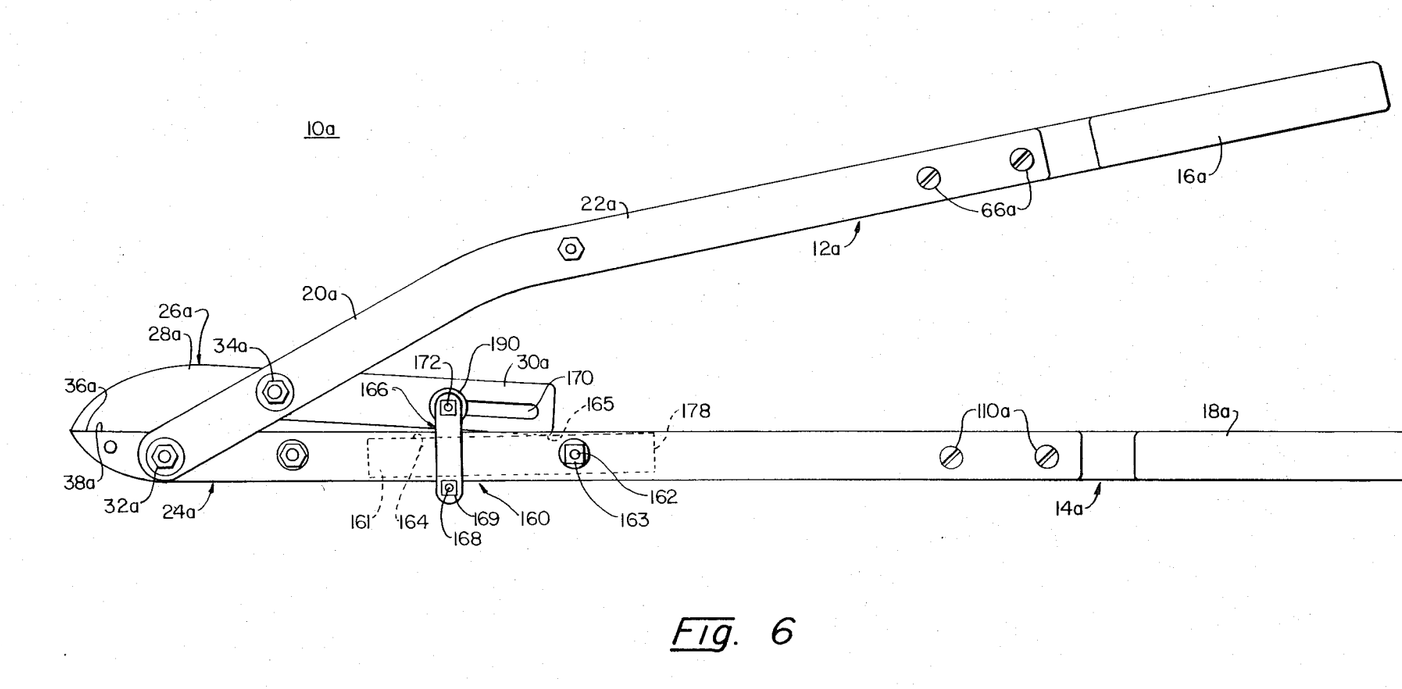
FIG. 6 is an elevational side view of an alternative preferred embodiment of the cutting device of this invention in the closed condition.

There is shown in FIG. 6 an alternative cutting device 10a, including handles 12a and 14a having hand grips 16a and 18a, respectively. Handle 12a includes a handle section 20a and a handle section 22a, extending at an angle from section 20a and including hand grip 16a. Stationary jaw 24a is attached by bolts 110a to the distal end of handle 14a. Movable jaw 26a includes a forward portion 28a and a rearward portion 30a. Pivot means 32a interconnects portion 20a of handle 12a with stationary jaw 24a, and pivot means 34a interconnects portion 20a of handle 12a with movable jaw 26a. Movable jaw 26a includes a cutting edge 36a which, in the closed condition of FIG. 6, abuttably engages engagement surface 38a of jaw 24a.

Means for constraining rearward portion 30a of jaw 26a includes guide means 160. In particular, a member 161 is disposed in an obscured longitudinal slot of jaw 24 and secured therein by means of a bolt 162 and nut 163 attached thereto. Member 161 includes an inclined upper cam surface 164 on which a cam follower portion 165 of rearward portion 30a rides. Guide means 160 further includes connector means 166, which is attached to stationary jaw 24a by means of a bolt 168 passing below jaw 24a and nut 169 attached thereto. Rearward portion 30a of jaw 26a includes a longitudinal slot 170 which receives a connector pin 172 of connector means 166, thereby providing slidable interconnection between jaw 26a and connector means 166.

Figure 7:
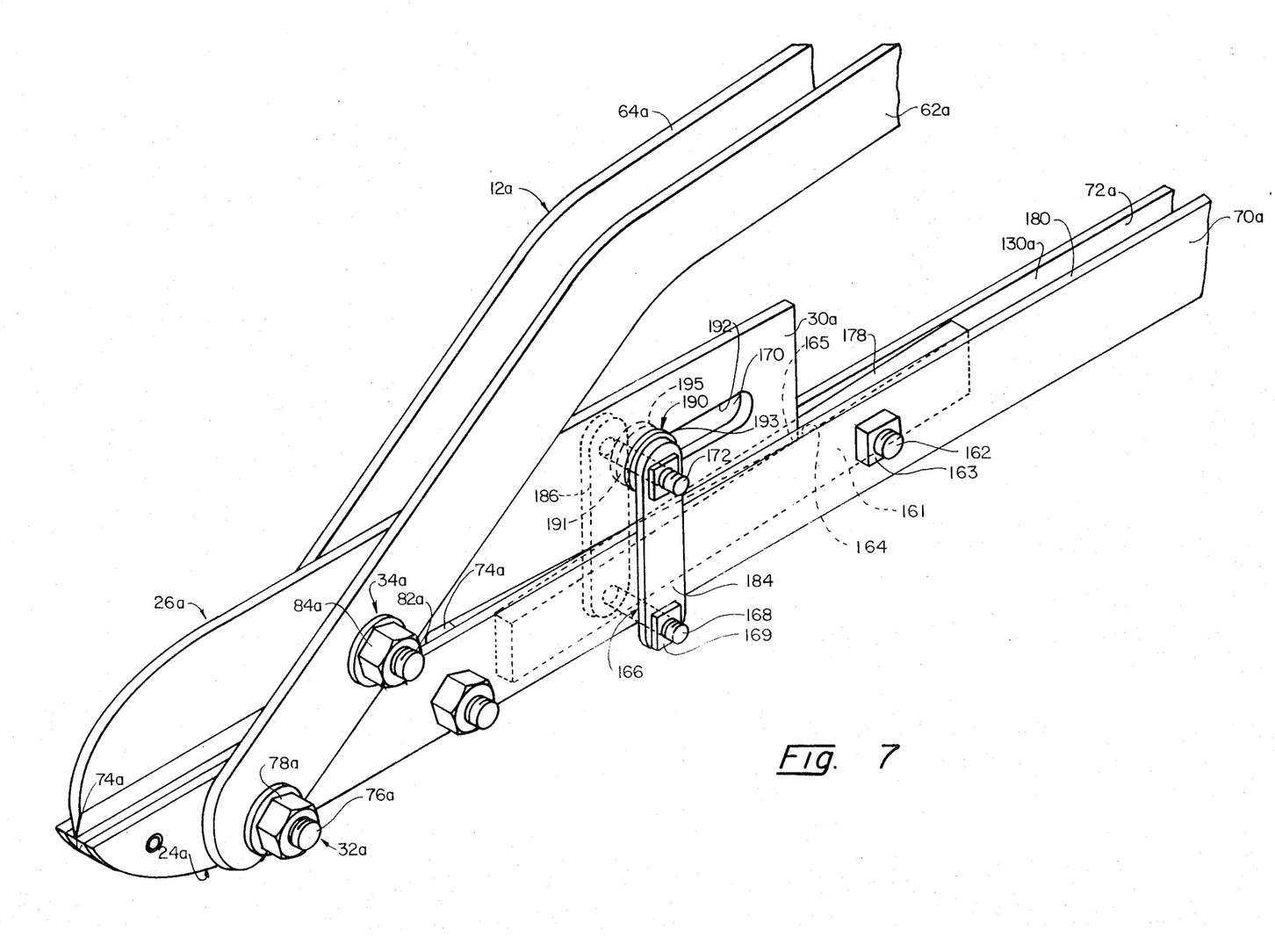
FIG. 7 is an axonometric view of a portion of the cutting device of FIG. 6.

The details of construction of cutters 10a are shown more clearly in FIG. 7. As indicated therein, handle 12a comprises elongate elements 62a and 64a sandwiched about a handle member 60a, FIG. 6, and attached thereto by means of bolts 66a, and obscured complementary nuts threadably attached to the bolts. Pivot means 32a, FIG. 7, includes a bolt 76a extending through elements 64a, 62a and stationary jaw 24a, and attached thereto by means of a nut 78a. Note that in each of the pivot means described in this embodiment, one or more washer elements may be utilized as in the embodiment disclosed in FIGS. 1–5. Pivot means 34a includes a bolt 82a extending through elements 64a and 62a of handle 12a, and through movable jaw 26a. A nut 84a secures bolt 82a in place.

Stationary jaw 24a includes elongate elements 70a and 72a, which are sandwiched about a central element 74a in much the same manner as in the previous embodiment. In the portion of jaw 24a behind central element 74a is disposed slot 130a which accommodates member 161. Bolt 162 extends through elements 72a and 70a and through member 161 therebetween, and nut 163 attaches to bolt 162 to urge elements 70a and 72a together and thus secure member 161 in place. Member 161 includes a cam surface 164, which is disposed as an inclined plane which rises toward the hand grip end of handle 14a. At the rearward end 178 of member 161, cam surface 164 is generally level with the upper surface 180 of stationary jaw 24a. Rearward portion 30a of movable jaw 26a extends into slot 130a and includes a cam follower portion 165, which rests on cam surface 164. When in the closed condition cam follower portion 165 is at the high rearward end 178 of cam surface 164. Connector means 166 includes a pair of connector elements 184, 186 disposed on either side of movable jaw 26a and stationary jaw 24a. Connector elements 184, 186 are interconnected to stationary jaw 24a by means of a bolt 168 extending through elements 184, and 186 and below elements 70a, 72a, and a nut 169 threadably secured to the bolt and tightened thereon to keep elements 184, 186 in place. Pin 172 extends between connector elements 184 and 186 through elongate slot 170 in jaw 26a. Pin 172 includes a roller 190 which accommodates the upper surface 192 of slot 170 and thereby allows relative slidable motion between movable jaw 26a and connector means 166.

Figure 8:
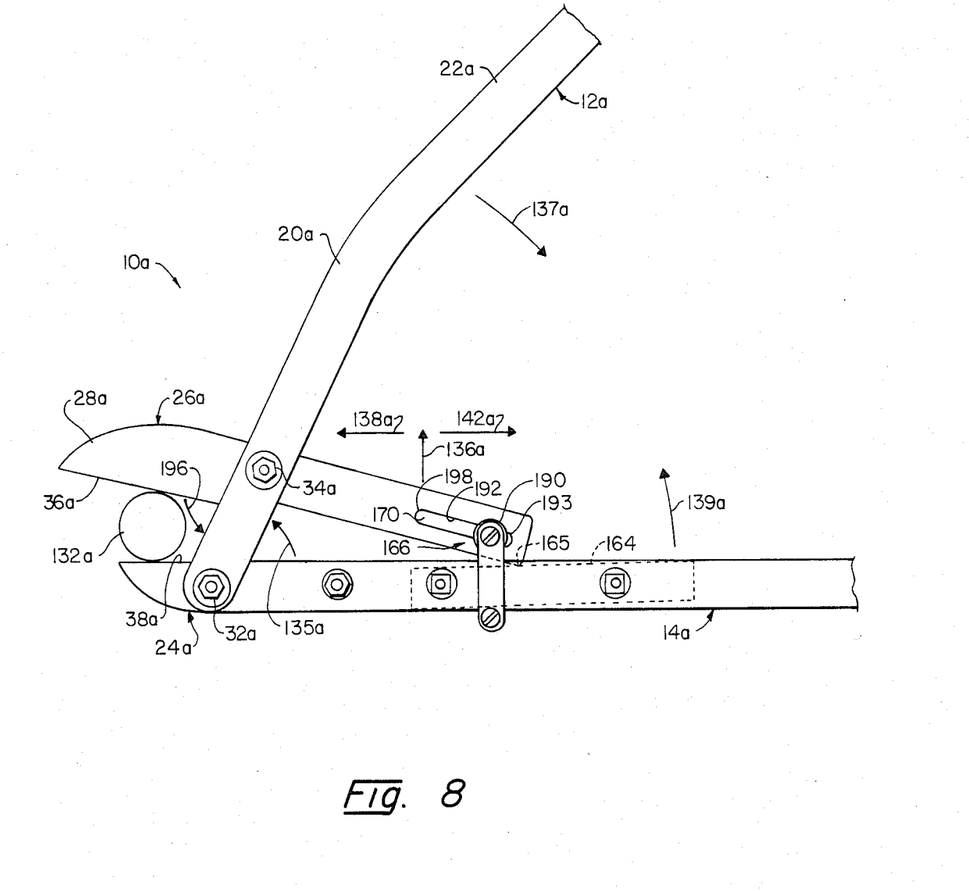
FIG. 8 is an elevational side view of a portion of the cutting device of FIGS. 6 and 7 in the open condition.

As shown in FIG. 8, cutters 10a are operated to cut a limb 132a by initially pivoting handles 12a and 14a apart. Handle section 20a pivots about pivot means 32a, 34a in the direction of arrow 135a. Movable jaw 26a is drawn in a forward direction as indicated by arrow 138a. Follower portion 165 rides over cam surface 164 to the deep forward end thereof. Forward portion 28a of jaw 26a is caused to open in the direction of arrow 136a. Jaw 26a may slide forward (and thus handles 12a, 14a may be pivoted apart to open jaws 24a, 26a) until the rearward end 193 of slot 170 interferes with roller 190 of connector means 166. Limb 132a is positioned between cutting edge 36a and engagement surface 38a and handles 12a and 14a are pivoted closed as indicated by arrows 137a, 139a. Jaw 26a slides in the rearward direction of arrow 142a. Cam follower 165 slides on cam surface 164 and rides upwardly thereon to attain the high rearward position indicated in FIGS. 6 and 7. In this manner, location of the rearward portion 30a of jaw 26a is maintained so that forward portion 28a approaches stationary jaw 24a in a rocking motion as indicated by arrow 196.

A similar function is performed by connector means 166. As handles 12a and 14a are closed, jaw 26a moves in the rearward direction of arrow 142a. Roller 190 rotatably bears on the upper surface 192 of slot 170. Roller 190 includes a bearing surface 191 upon which surface 192 bears and flanges 193, 195 which prevent relative lateral motion between the roller and the jaw and resultant disengagement thereof. As jaw 26a moves so that the position of connector 166 is altered relatively from the rear 193 to the front 198 of slot 170, the bearing engagement between roller 190 and the upper surface 192 of slot 170 maintains the location of rearward portion 30a of jaw 26a, i.e. limits descent of rearward portion 30a into stationary jaw slot 130a. Therefore, forward portion 28a of jaw 26a will approach engagement surface 38a of jaw 24a in the rocking action indicated by arrow 192. Therefore, although both are illustrated in the embodiment of FIGS. 6–8, either the connector means 166 or the inclined cam surface 164 alone will be sufficient to constrain the rearward portion 30a of jaw 26a so that the illustrated rocking action will be performed as the jaws are closed. Such constraint amplifies the leverage applied to jaws 26a and 28a by handles 12a and 14a through pivots 32a and 34a. Quick and effective cutting of limb 132a is thereby enabled.

Figure 9:
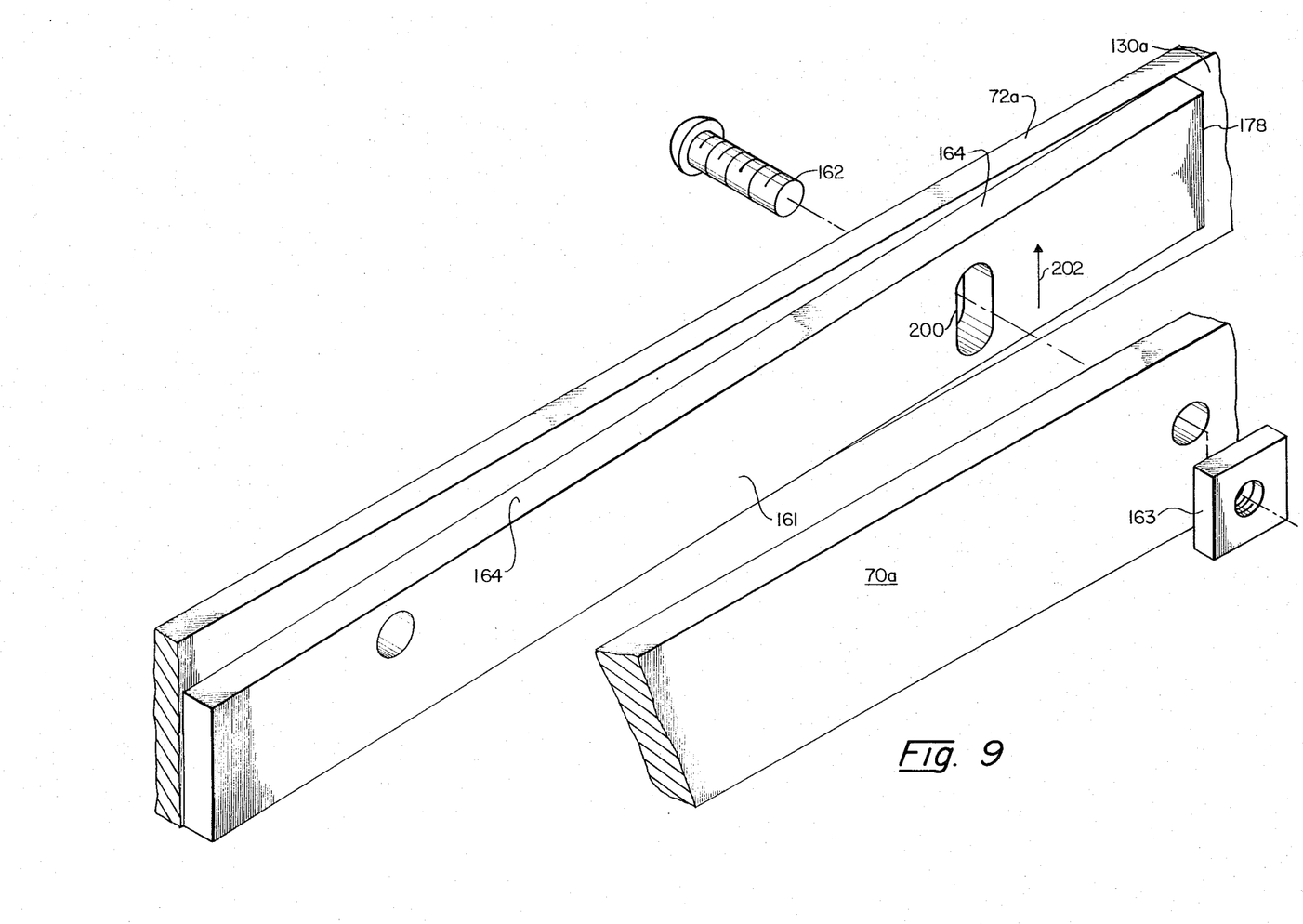
FIG. 9 is an exploded view of the means for adjusting the cutting device of FIGS. 6-8.

The rearward portion 30a of jaw 26a may be adjusted so that cutting edge 36a abuttably engages engagement surface 38a in the closed condition, despite wear of the cutting edge due to continued use. As shown in FIG. 9, member 161 includes an adjustment slot 200 through which bolt 162 extends. When cutting edge 36a, FIGS. 6–8, of jaw 26a has worn down, nut 163 is loosened, thereby reducing the bearing pressure exerted by elements 70a and 72a upon member 161. Member 161 is thus freed to move upwardly in slot 130a in the direction of arrow 202. Cam surface 164 is raised accordingly so that when the cam follower portion reaches the high rearward end 178 of member 161 (in the closed condition) the rearward end of the movable jaw is raised and the forward end thereof pivoted downwardly. The worn cutting edge of the movable jaw is thus reset to abuttably engage the engagement surface of the stationary jaw.

Although each of the embodiments heretofore described exhibits a single cutting edge and an engagement surface for providing cutting action, it should be appreciated that alternatively both of the jaws of this invention may employ cutting edges for engaging in a shearing action rather than an aubtting engagement cutting action.

Other embodiments will occur to those skilled in the art and are within the following claims:

What is claimed is:

1. An improved cutting device comprising:
   first and second handles, each having a gripping end and a distal end opposite said gripping end, and a movable jaw having forward and rearward portions;
   a stationary jaw fixed to said first handle, said second handle including first pivot means proximate said distal end thereof for connecting said second handle to said stationary jaw and second pivot means spaced longitudinally from said first pivot means and disposed between the gripping end thereof and said first pivot means for connecting said second handle to said movable jaw for providing slicing action between said jaws, at least one of said jaws including a cutting edge; and
   means, spaced from said first and second pivot means and engaging the rearward portion of said movable jaw, for constraining motion of said rearward portion of said movable jaw and amplifying the closing leverage applied to said jaws by said handles through said first and second pivot means when said handles are pivoted together.

2. The device of claim 1 in which said means for constraining includes link means spaced from and generally parallel to the portion of said second handle extending between said first and second pivot means and having third and fourth pivot means interconnecting said link means with said stationary and movable jaws, respectively.

3. The device of claim 2 in which said stationary and movable jaws are arranged parallel to each other.

4. The device of claim 1 in which said means for constraining includes guide means for maintaining location of said rearward portion of said movable jaw relative to said stationary jaw so that said forward portion of said movable jaw approaches said stationary jaw in a rocking motion.

5. The device of claim 4 in which said guide means includes a cam surface on one of said jaws and a cam follower on the other.

6. The device of claim 4 in which said guide means includes connector means slidably interconnecting said stationary and movable jaws.

7. The device of claim 6 in which said connector means includes a follower pin mounted on one of said jaws and a slot for receiving said pin in the other jaw.

8. The device of claim 7 in which said follower pin includes a roller.

9. The device of claim 1 further including adjustment means for controlling distance between said rearward portion of said movable jaw and said stationary jaw so that said forward portion of said movable jaw is set to engage said stationary jaw.

10. The device of claim 1 in which the other said jaw includes an engagement surface for abuttably engaging said cutting edge when said handles are pivoted together.

11. An improved cutting device comprising:
first and second handles and a movable jaw having forward and rearward portions;
a stationary jaw fixed to said first handle, said second handle including first pivot means for connecting said second handle to said stationary jaw and second pivot means for connecting said second handle to said movable jaw for enabling said jaws to engage in a slicing action in which said movable jaw moves in a rearward direction when said handles are pivoted together and a forward direction when said handles are pivoted apart, at least one of said jaws including a cutting edge; and
link means spaced from and generally parallel to the portion of said second handle extending between said first and second pivot means and having third and fourth pivot means interconnecting said link means with said stationary and movable jaws, respectively to constrain motion of said rearward portion of said movable jaw and amplify leverage applied to said jaws by said handles through said first and second pivot means.

12. An improved cutting device comprising:
first and second handles and a movable jaw having forward and rearward portions;
a stationary jaw fixed to said first handle, said second handle including first pivot means for connecting said second handle to said stationary jaw and second pivot means for connecting said second handle to said movable jaw for providing slicing action between said jaws, at least one of said jaws including a cutting edge; and
link means spaced from and generally parallel to the portion of said second handle extending between said first and second pivot means and having third and fourth pivot means interconnecting said link means with said stationary and movable jaws, respectively, to constrain motion of said rearward portion of said movable jaw and amplify the leverage applied to said jaws by said handles through said first and second pivot means.

13. The device of claim 12 in which said stationary and movable jaws are arranged parallel to each other.

14. The device of claim 12 further including adjustment means for controlling distance between said rearward portion of said movable jaw and said stationary jaw so that said forward portion of said movable jaw is set to engage said stationary jaw.

15. The device of claim 12 in which the other said jaw includes an engagement surface for abuttably engaging said cutting edge when said handles are pivoted together.

16. An improved cutting device comprising:
first and second handles each having a gripping end and a distal end opposite said gripping end, and a movable jaw having forward and rearward portions;
a stationary jaw fixed to said first handle, said second handle including first pivot means proximate said distal end thereof for connecting said second handle to said stationary jaw and second pivot means spaced longitudinally from said first pivot means and disposed between said gripping end thereof and said first pivot means for connecting said second handle to said movable jaw for providing slicing action between said jaws, at least one of said jaws including a cutting edge; and
a cam surface on one of said jaws and a cam follower on the other spaced from said first and second pivot means and engaging the rearward portion of said movable jaw for maintaining location of said rearward portion of said movable jaw so that said forward portion of said movable jaw approaches said stationary jaw in a rocking motion and for amplifying the closing leverage applied to said jaws by said handles through said first and second pivot means when said handles are pivoted together.

17. An improved cutting device comprising:
first and second handles each having a gripping end and a distal end opposite said gripping end, and a movable jaw having forward and rearward portions;
a stationary jaw fixed to said first handle, said second handle including first pivot means proximate said distal end thereof for connecting said second handle to said stationary jaw and second pivot means spaced longitudinally from said first pivot means and disposed between said gripping end thereof and said first pivot means for connecting said second handle to said movable jaw for enabling said jaws to engage in a slicing action in which said movable jaw moves in a rearward direction when said handles are pivoted together and a forward direction when said handles are pivoted apart, at least one of said jaws including a cutting edge; and
guide means spaced from said first and second pivot means and engaging the rearward portion of said movable jaw for maintaining location of said rearward portion of said movable jaw relative to said stationary jaw so that said forward portion of said movable jaw approaches said stationary jaw in a rocking motion and for amplifying the closing leverage applied to said jaws by said handles through said first and second pivot means when said handles are pivoted together.

18. The device of claim 17 in which said guide means includes a cam surface on one of said jaws and a cam follower on the other.

19. The device of claim 17 in which said guide means includes connector means slidably interconnecting said stationary and movable jaws.

20. The device of claim 19 in which said connector means includes a follower pin mounted on one of said jaws and a slot for receiving said pin in the other jaw.

21. The device of claim 20 in which said follower pin includes a roller.

22. The device of claim 17 further including adjustment means for controlling distance between said rearward portion of said movable jaw and said stationary jaw so that said forward portion of said movable jaw is set to engage said stationary jaw.

23. The device of claim 17 in which the other said jaw includes an engagement surface for abuttably engaging said cutting edge when said handles are pivoted together.

24. An improved cutting device comprising:

first and second handles each having a gripping end and a distal end opposite said gripping end, and a movable jaw having forward and rearward portions;

a stationary jaw fixed to said first handle, said second handle including first pivot means proximate said distal end thereof for connecting said second handle to said stationary jaw and second pivot means spaced longitudinally from said first pivot means and disposed between said gripping end thereof and said first pivot means for connecting said second handle to said movable jaw for enabling said jaws to engage in a slicing action in which said movable jaw moves in a rearward direction when said handles are pivoted together and a forward direction when said handles are pivoted apart, at least one of said jaws including a cutting edge; and connector means slidably interconnecting said stationary and movable jaws, said connector means including a follower pin which includes a roller mounted on one of said jaws and a slot for receiving said follower pin and roller on the other jaw for maintaining location of said rearward portion of said movable jaw so that said forward portion of said movable jaw approaches said stationary jaw in a rocking motion, and for amplifying the closing leverage applied to said jaws by said handles through said first and second pivot means when said handles are pivoted together.

25. An improved cutting device comprising:

first and second handles each having a gripping end and a distal end opposite said gripping end, and a movable jaw having forward and rearward portions;

a stationary jaw fixed to said first handle, said second handle including first pivot means proximate said distal end thereof for connecting said second handle to said stationary jaw and second pivot means spaced longitudinally from said first pivot means and disposed between said gripping end thereof and said first pivot means for connecting said second handle to said movable jaw for enabling said jaws to engage in a slicing action in which said movable jaw moves in a rearward direction when said handles are pivoted together and a forward direction when said handles are pivoted apart, at least one of said jaws including a cutting edge; and means, spaced from said first and second pivot means and engaging the rearward portion of said movable jaw, for constraining motion of said rearward portion of said movable jaw and amplifying the closing leverage applied to said jaws by said handles through said first and second pivot means when said handles are pivoted together.

26. An improved cutting device comprising:

first and second handles each having a gripping end and a distal end opposite said gripping end, and a movable jaw having forward and rearward portions;

a stationary jaw fixed to said first handle, said second handle including first pivot means proximate said distal end thereof for connecting said second handle to said stationary jaw and second pivot means spaced longitudinally from said first pivot means and disposed between said gripping end thereof and said first pivot means for connecting said second handle to said movable jaw for enabling said jaws to engage in a slicing action in which said movable jaw moves in a rearward direction when said handles are pivoted together and a forward direction when said handles are pivoted apart, at least one of said jaws including a cutting edge; and guide means spaced from said first and second pivot means and engaging the rearward portion of said movable jaw for maintaining location of said rearward portion of said movable jaw relative to said stationary jaw so that said forward portion of said movable jaw approaches said stationary jaw in a rocking motion and for amplifying the closing leverage applied to said jaws by said handle through said first and second pivot means when said handles are pivoted together.

27. An improved cutting device comprising:

first and second handles, each having a gripping end and a distal end opposite said gripping end, and a movable jaw having forward and rearward portions;

a stationary jaw fixed to said first handle, said second handle including first pivot means proximate said distal end thereof for connecting said second handle to said stationary jaw and second pivot means between the gripping end thereof and said first pivot means for connecting said second handle to said movable jaw for providing slicing action between said jaws, at least one of said jaws including a cutting edge;

means, spaced from said first and second pivot means and engaging the rearward portion of said movable jaw, for constraining motion of said rearward portion of said movable jaw and amplifying the closing leverage applied to said jaws by said handles through said first and second pivot means when said handles are pivoted together; and adjustment means for controlling distance between said rearward portion of said movable jaw and said stationary jaw so that said forward portion of said movable jaw is set to engage said stationary jaw.

* * * * *